Aug. 19, 1924.
C. ANDRADE. JR
1,505,687
CONTROL MEMBER FOR DIFFERENTIALS
Original Filed March 15, 1923
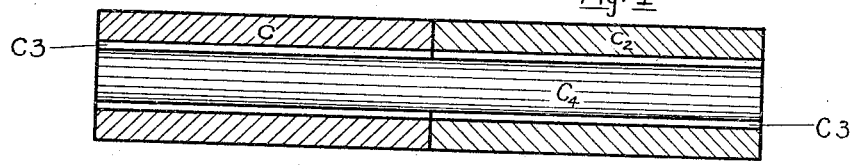
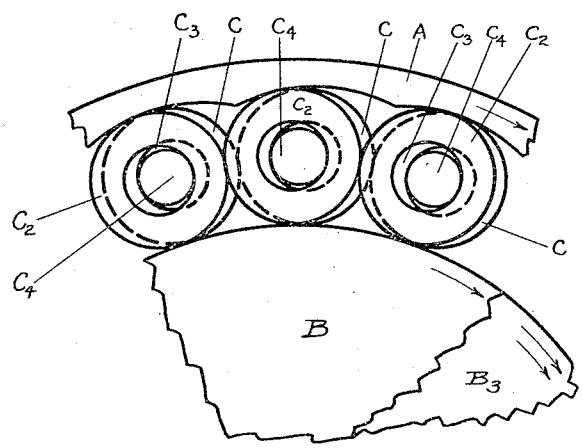
INVENTOR
Cipriano Andrade Jr.

Patented Aug. 19, 1924.

1,505,687

UNITED STATES PATENT OFFICE.

CIPRIANO ANDRADE, JR., OF NEW YORK, N. Y.

CONTROL MEMBER FOR DIFFERENTIALS.

Original application filed March 15, 1923, Serial No. 625,333. Divided and this application filed July 27, 1923. Serial No. 654,166.

*To all whom it may concern:*

Be it known that I, CIPRIANO ANDRADE, Jr., a citizen of the United States, residing at New York, in the county of New York and State of New York, have invented a new and useful Control Member for Differentials, of which the following is a divisional specification.

My invention relates to control members for differentials. My present device is a part of my original application Serial No. 625,333, filed March 15th, 1923, and transferred from said original application to the present divisional application by direction of the Patent Office. The object of my present invention is, to provide a new form of control member for use in conjunction with hollow roller locking members.

I attain these objects by the mechanism illustrated in the accompanying drawings, in which—

Figure 1. is a form of control between the opposite roller locking members.

Fig. 2. is a diagrammatic view of the rollers and controls when performing a differential function. It will be understood that all of the rollers on each driven member are in contact with each other, as fully shown in Fig. 2. of my original application.

Similar letters refer to similar parts throughout the several views.

A is the driving member, B and B³ are the respective driven members. C are the locking rollers on driven member B³, and C² are the locking rollers on driven member B. Each of the hollow rollers C and C² has a recess C³, which recesses C³ contain an independent lug C⁴ which permits a limited circumferential motion of one roller in relation to the other about the periphery of the driven member.

The functioning of said rollers and controls has been fully described in said original application.

As will be seen from the arrows in Fig. 2, the driving member A is rotating at the same speed as driven member B, and rollers C² are locked between them. Driven member B³ is rotating faster than driving member A or driven member B, and therefore the rollers C, which are on driven member B³, are out of locking contact with driving member A.

It will be understood, that the independent element C⁴ need not be of uniform diameter for its entire length, but if it is made large enough to fit tightly into one of the rollers, and yet has a diameter smaller than the diameter of the recess in the other roller, it will perform the function of holding the two rollers to limited circumferential motion, like the lugs C¹ in my original application.

I claim:

1. In a differential; a first locking roller having a longitudinal open space; a second locking roller having a longitudinal open space; and a third independent element adapted to enter both of said open spaces longitudinally, said independent element having a diameter less than the diameter of one of said longitudinal open spaces.

2. In a differential; a first locking roller having a longitudinal open space; a second locking roller having a longitudinal open space; and a third independent element adapted to enter both of said open spaces longitudinally, said independent element having a diameter less than the diameter of each of said longitudinal open spaces.

3. In a differential; a driving member; a first driven member; a second driven member; a first set of locking rollers between the driving member and the first driven member, said rollers being arranged in contact with each other, and having longitudinal open spaces; a second set of locking rollers between the driving member and the second driven member, said rollers being arranged in contact with each other, and having longitudinal open spaces; and independent elements adapted to enter the open spaces of each pair of longitudinally positioned rollers, said independent element having a diameter less than the diameter of said longitudinal open spaces.

4. In a differential; a driving member; a first driven member; a second driven member; a first locking roller between the driving member and the first driven member, said roller having a longitudinal open space; a second locking roller between the driving member and the second driven member, said roller having a longitudinal open space; and an independent element adapted to enter the open spaces of each roller, said independent element having a diameter less than the diameter of one of said longitudinal open spaces.

5. In a differential; a driving member; a first driven member; a second driven member; a first locking roller between the driving member and the first driven member, said roller having a longitudinal open space; a second locking roller between the driving member and the second driven member, said roller having a longitudinal open space; and an independent element adapted to enter the open spaces of each roller, said independent element having a diameter less than the diameter of each of said longitudinal open spaces.

6. In a differential; a driving member; a first driven member; a second driven member; a first set of locking rollers between the driving member and the first driven member, said rollers being arranged in contact with each other, and having longitudinal open spaces; a second set of locking rollers between the driving member and the second driven member, said rollers being arranged in contact with each other, and having longitudinal open spaces; and independent elements adapted to enter the open spaces of each pair of longitudinally positioned rollers, each of said independent elements having a diameter less than the diameter of the longitudinal open space in one of said longitudinally positioned rollers.

7. In a differential; a driving member; a first driven member; a second driven member; a first set of locking rollers between the driving member and the first driven member, said rollers being arranged in contact with each other, and having longitudinal open spaces; a second set of locking rollers between the driving member and the second driven member, said rollers being arranged in contact with each other, and having longitudinal open spaces; and an independent element adapted to enter the open spaces of a pair of longitudinally positioned rollers, said independent element having a diameter less than the diameter of the longitudinal open space in one of said longitudinally positioned rollers.

CIPRIANO ANDRADE, Jr.